(12) United States Patent
Boutin

(10) Patent No.: US 11,804,096 B2
(45) Date of Patent: Oct. 31, 2023

(54) SYSTEM FOR AUTOMATIC FILLING OF MEDICATION ORGANIZERS

(71) Applicant: SYNERGIE MÉDICALE BRG INC., Longueuil (CA)

(72) Inventor: Jean Boutin, Longueuil (CA)

(73) Assignee: SYNERGIE MÉDICALE BRG INC., Longueuil (CA)

(*) Notice: Subject to any disclaimer, the term of this patent is extended or adjusted under 35 U.S.C. 154(b) by 0 days.

(21) Appl. No.: 18/177,406

(22) Filed: Mar. 2, 2023

(65) Prior Publication Data

US 2023/0206715 A1 Jun. 29, 2023

Related U.S. Application Data

(62) Division of application No. 16/476,360, filed as application No. PCT/CA2018/000037 on Feb. 27, 2018, now Pat. No. 11,605,261.

(Continued)

(51) Int. Cl.
*A61J 7/00* (2006.01)
*G07F 17/00* (2006.01)
(Continued)

(52) U.S. Cl.
CPC ........ *G07F 17/0092* (2013.01); *A61J 7/0069* (2013.01); *A61J 7/0076* (2013.01);
(Continued)

(58) Field of Classification Search
CPC ...... G07F 17/0092; G07F 11/02; G07F 11/46; G07F 11/62; G07F 11/70; G07F 9/002;
(Continued)

(56) References Cited

U.S. PATENT DOCUMENTS 5,405,048 A 4/1995 Rogers et al.
6,887,431 B1 5/2005 Vann et al.
(Continued)

FOREIGN PATENT DOCUMENTS

WO 2013181416 A1 12/2013
WO 2018157231 A1 9/2018

OTHER PUBLICATIONS

"EP 18761568.7 SR dated Jul. 14, 2020".
(Continued)

*Primary Examiner* — Michael Collins
(74) *Attorney, Agent, or Firm* — Myers Bigel, P.A.

(57) ABSTRACT

A system for automatic filling of medication organizers comprises i) a storage unit for medication containers that is accessible from a first side thereof ii) a plurality of medication organizer filling units, each having a temporary storage rack that is accessible from a side of the medication filling units that faces the storage unit, and iii) a container handling system that is positioned between the storage unit and the temporary storage racks and that is movable between the storage unit and each of the temporary storage racks for transferring selected medication containers therebetween. The system allows minimizing idle times by moving medication containers between the storage unit and temporary storage racks simultaneously to the filling process.

16 Claims, 13 Drawing Sheets

Related U.S. Application Data

(60) Provisional application No. 62/465,194, filed on Mar. 1, 2017.

(51) Int. Cl.

| | | |
|---|---|---|
| *A61J 7/04* | (2006.01) | |
| *G07F 11/70* | (2006.01) | |
| *B65B 35/06* | (2006.01) | |
| *B65B 5/12* | (2006.01) | |
| *B65B 5/08* | (2006.01) | |
| *G06Q 10/0833* | (2023.01) | |
| *G06Q 10/0875* | (2023.01) | |
| *G07F 11/02* | (2006.01) | |
| *G07F 11/46* | (2006.01) | |
| *G07F 11/62* | (2006.01) | |
| *G07F 9/00* | (2006.01) | |
| *G07F 11/16* | (2006.01) | |

(52) U.S. Cl.
CPC ................... *A61J 7/04* (2013.01); *B65B 5/08* (2013.01); *B65B 5/12* (2013.01); *B65B 35/06* (2013.01); *G06Q 10/0833* (2013.01); *G06Q 10/0875* (2013.01); *G07F 9/002* (2020.05); *G07F 11/02* (2013.01); *G07F 11/1657* (2020.05); *G07F 11/46* (2013.01); *G07F 11/62* (2013.01); *G07F 11/70* (2013.01); *B65G 2203/0216* (2013.01); *B65G 2209/04* (2013.01)

(58) Field of Classification Search
CPC ... G07F 11/1657; A61J 7/0069; A61J 7/0076; A61J 7/04; B65B 5/08; B65B 5/12; B65B 35/06; G06Q 10/0833; G06Q 10/0875; B65G 2203/0216; B65G 2209/04
See application file for complete search history.

(56) References Cited

U.S. PATENT DOCUMENTS

| | | |
|---|---|---|
| 7,228,198 B2 | 6/2007 | Vollm et al. |
| 7,661,249 B2 | 2/2010 | Monti |
| 7,770,363 B2 | 8/2010 | Monti |
| 7,912,582 B1 | 3/2011 | Holtje et al. |
| 8,000,836 B2 | 8/2011 | Pinney et al. |
| 8,060,248 B1 | 11/2011 | Boyer et al. |
| 8,230,662 B2 | 7/2012 | Boutin |
| 8,869,663 B2 | 10/2014 | Greyshock et al. |
| 9,241,875 B2* | 1/2016 | Davis .................. A61J 1/06 |
| 10,529,166 B2 | 1/2020 | Bouthiette |
| 11,605,261 B2* | 3/2023 | Boutin ............... G06Q 10/0875 |
| 2004/0059463 A1* | 3/2004 | Coughlin ............ G07F 11/165 |
| | | 700/229 |
| 2006/0136095 A1 | 6/2006 | Rob et al. |
| 2007/0262147 A1 | 11/2007 | Braun et al. |
| 2009/0173779 A1* | 7/2009 | Szesko .................. G16H 20/13 |
| | | 235/375 |
| 2010/0042255 A1 | 2/2010 | Boutin |
| 2010/0300041 A1 | 12/2010 | Kim |
| 2011/0054668 A1 | 3/2011 | Holmes et al. |
| 2011/0173926 A1 | 7/2011 | Yuyama et al. |
| 2013/0018503 A1 | 1/2013 | Carson et al. |
| 2013/0318931 A1 | 12/2013 | Holmes |
| 2013/0340390 A1 | 12/2013 | Carson et al. |
| 2014/0250829 A1 | 9/2014 | Terzini |
| 2015/0128534 A1 | 5/2015 | Bouthiette et al. |
| 2016/0068328 A1* | 3/2016 | 'T Lam ............. B65D 83/0409 |
| | | 53/244 |

OTHER PUBLICATIONS

"Examination Report Corresponding to European Application No. 18761568.7 dated Nov. 8, 2021".
"WO PCT/CA2018/000037—ISR".
"WO PCT/CA2018/000037—WO".

\* cited by examiner

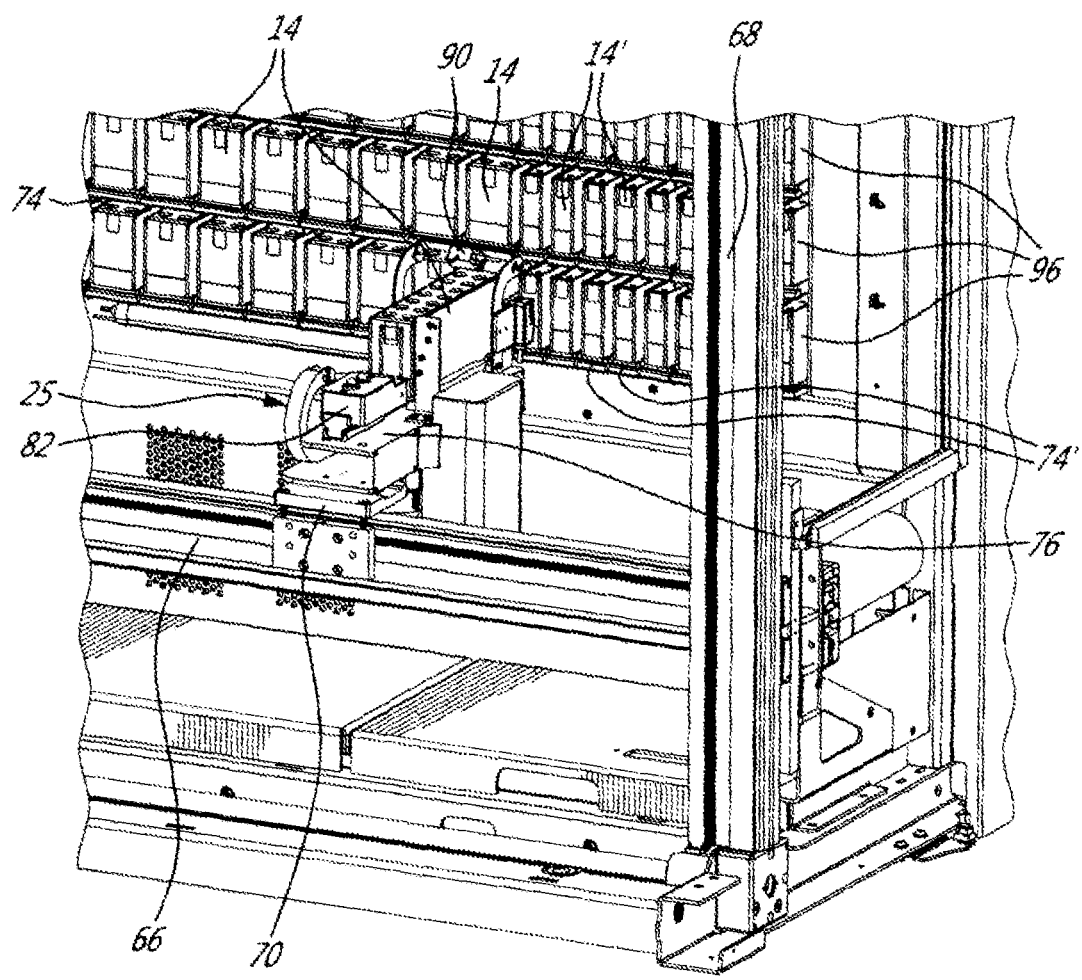

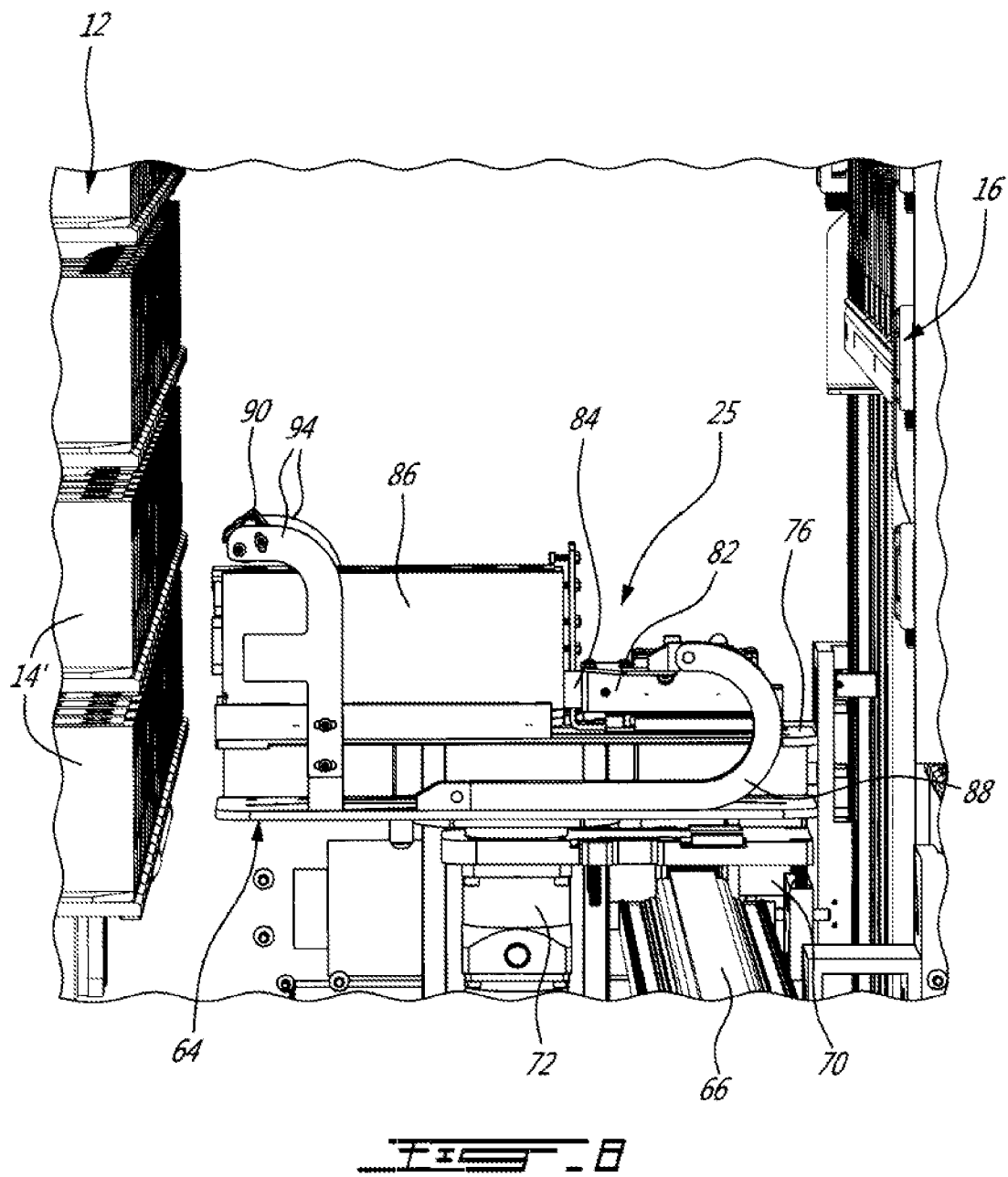

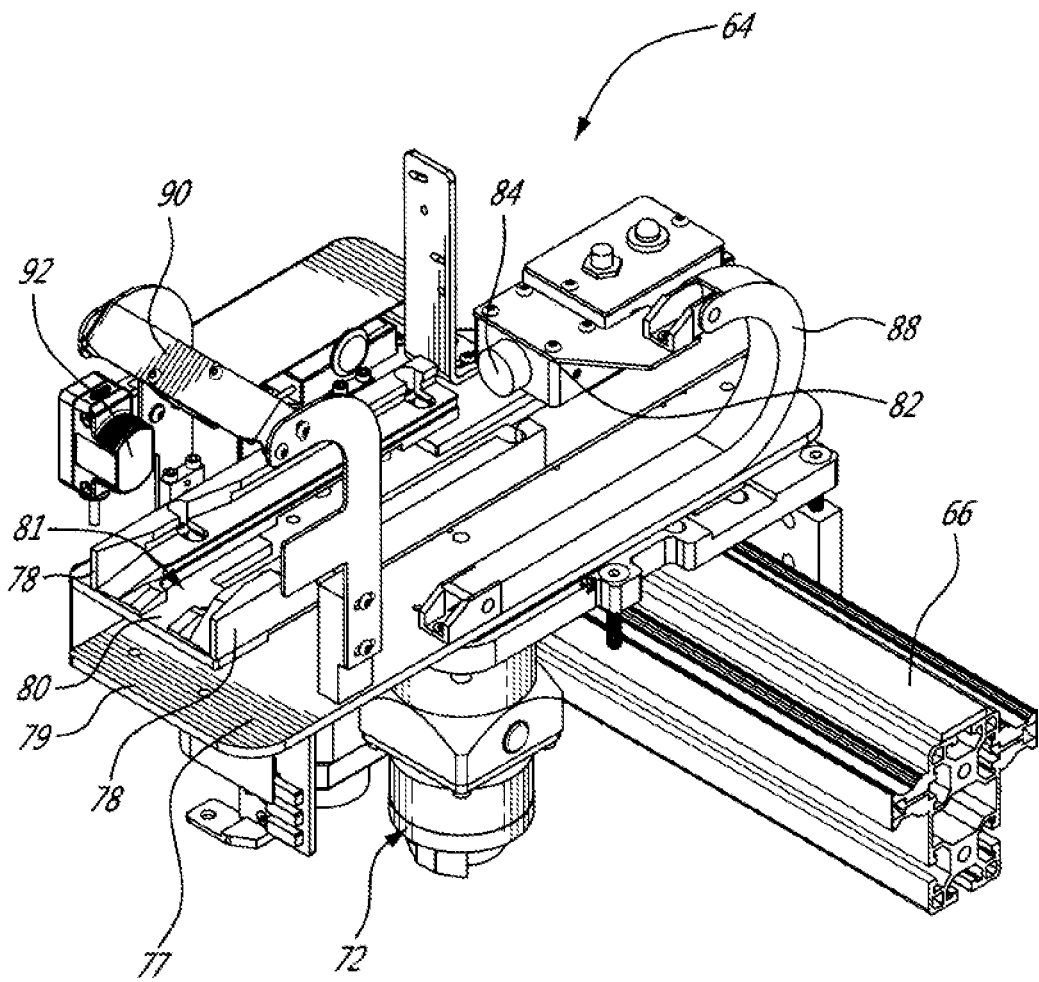

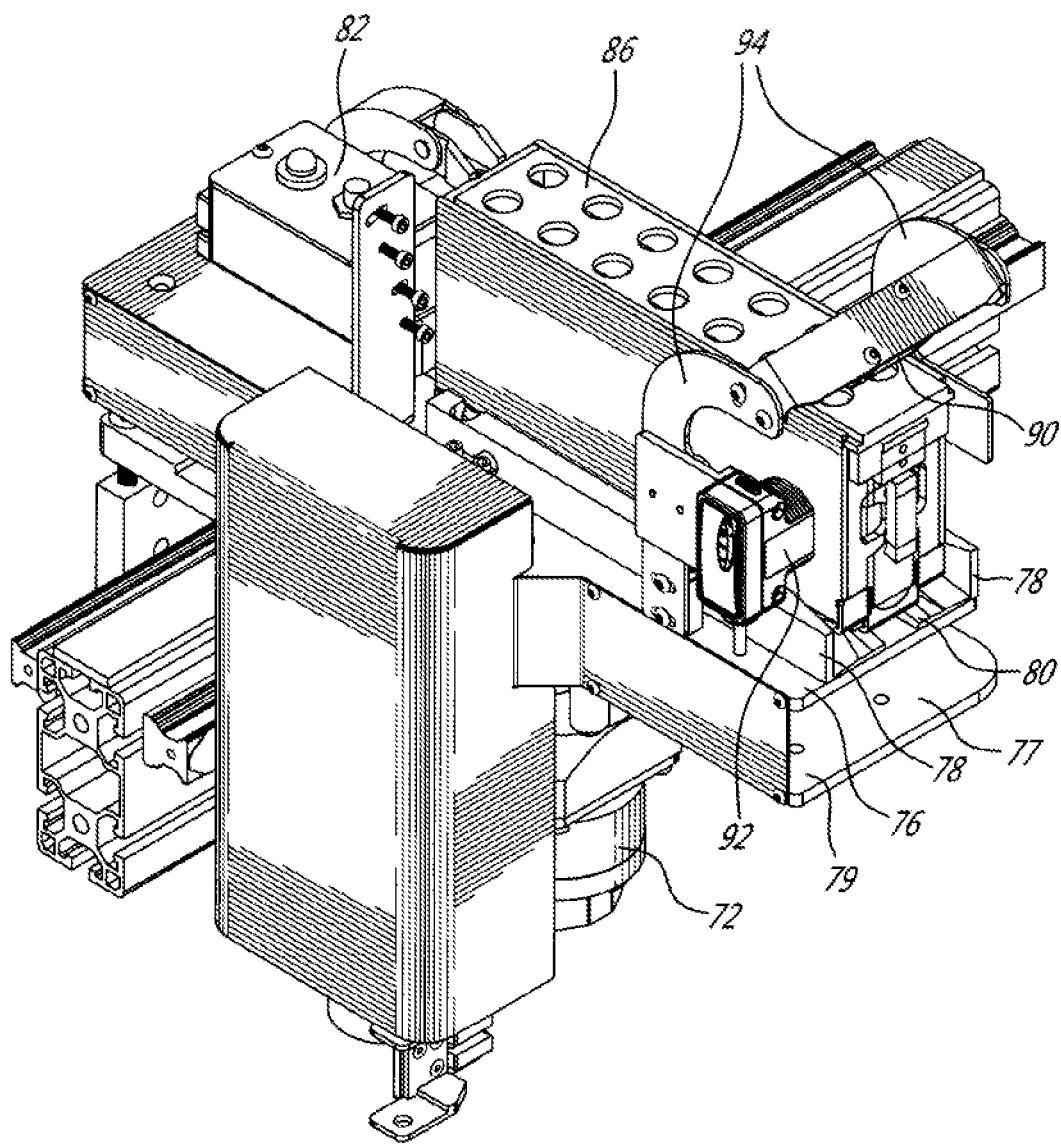

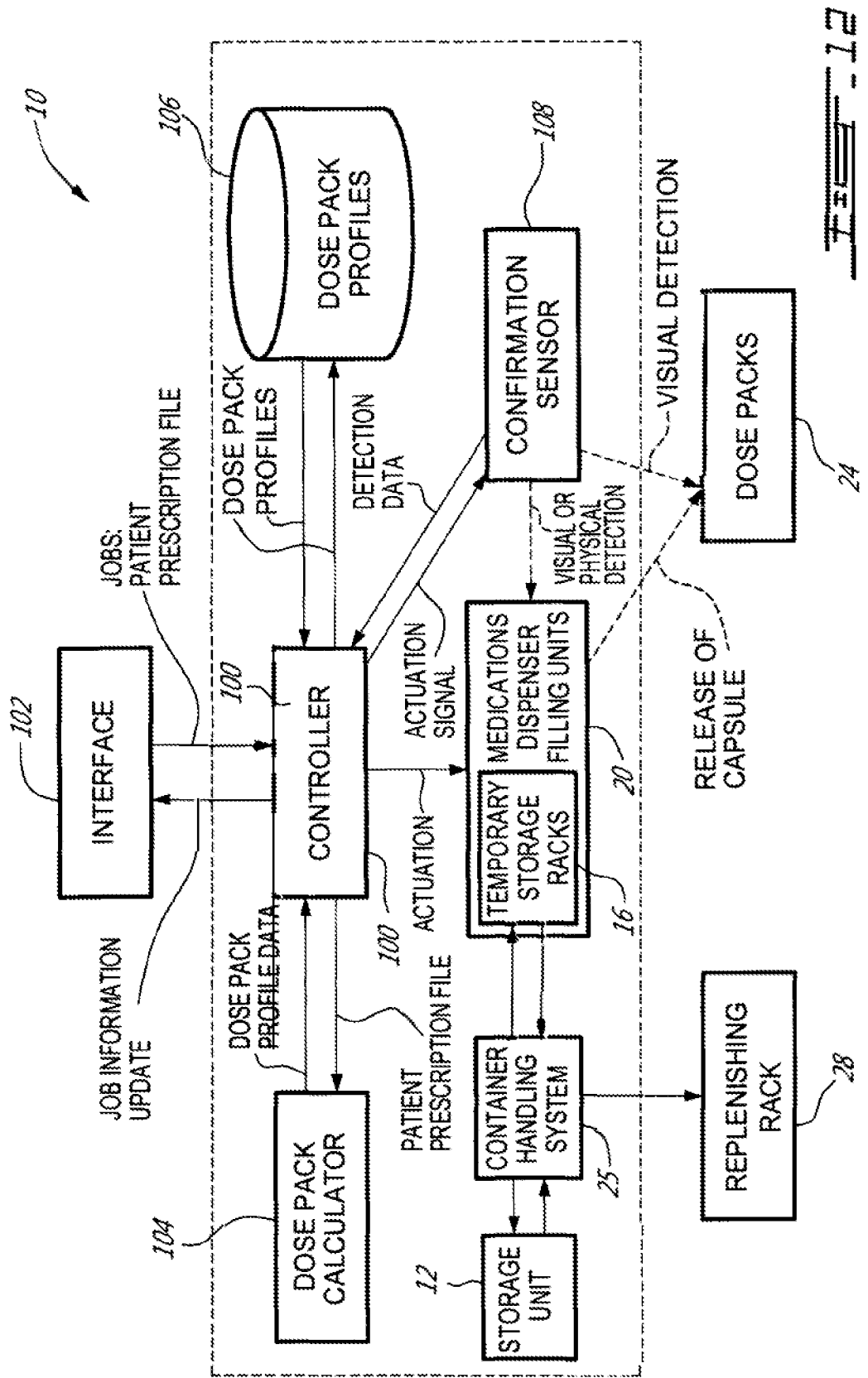

SYSTEM FOR AUTOMATIC FILLING OF MEDICATION ORGANIZERS

CROSS-REFERENCE TO RELATED APPLICATIONS

This application is a divisional of and claims priority to U.S. patent application Ser. No. 16/476,360, filed on Jul. 8, 2019, now U.S. Pat. No. 11,605,261, which is a 35 U.S.C. § 371 national phase application of PCT Application PCT/CA2018/000037 filed on Feb. 27, 2018, which claims the benefit of and priority to U.S. Provisional Application No. 62/465,194, filed on Mar. 1, 2017, the entire contents of each of which are incorporated by reference herein in its entirety.

BACKGROUND

The present disclosure concerns the distribution of pills. More specifically, the present disclosure is concerned with a system for automatic filling of medication organizers.

Doses of medication over prescribed periods vary as a function of the type of medication and the condition of the patient. Patients are often required to take a plurality of doses over different periods of a day, and this often leads to confusion. It may be difficult for a patient to respect the prescription details (e.g., intake time, quantity) when the doses and the types of medication are numerous.

One well known method used by pharmacists to overcome this problem is to provide the patient with a dose pack having an array of receptacles, with each receptacle corresponding to a particular time of a day at which medication is to be taken. Such packs typically contain four receptacles per day for seven days, and these receptacles are in the form of sealed cups filled with appropriate medication by pharmacists as a function of the prescription, as determined by physicians' prescription.

The process of preparing these dose packs is labor-intensive, in that each receptacle must be filled individually by hand. Therefore, although the dose pack facilitates the intake of medication by patients, a substantial amount of time is required to fill these packs by pharmacists.

U.S. Pat. No. 8,230,662 B2 issued to Synergie Medicale Brg Inc. on Jul. 31, 2012, naming Boutin as the inventor, and titled "Medication Dispenser System" discloses a system for filling medication dose packs with oral-solid medication items. The system comprises storage tray drawers each having storage trays. Each storage tray stores a specific type of oral solid medication item. The storage tray drawers are displaceable to a drawn position to expose the storage trays thereof. A table supports dose packs having a plurality of receptacles arranged in rows, with each receptacle associated with an intake time and date of a patient prescription file. A dispensing mechanism, provided with an output arm is displaceable along the axes X, Y and Z in order to transport medication items from the medication storage tray drawer to the dose packs.

A drawback of this system from Synergie Medicate Brg Inc. is that it is not adapted for the centralized preparation of dose packs for several pharmacies, which requires systems with a higher level of production. A plurality of systems as described by Boutin could be used, but a relatively great space would be required for such an implementation.

United States Publication No. US 2013/0340390, published on Dec. 26, 2013, titled "Method and Apparatus for Automated Filling of Packagings with Medications" and naming Carson et al. as the inventors describes an automated packaging station including i) a filing location having a turntable assembly that dispenses medications in blister packs, ii) storage carrousels, each having a plurality of cassettes filled with medications, and iii) a robot that moves cassettes between the storage carrousels and the filing location. The filing location includes loading and unloading staging tables that allows the exchange of cassettes by the robot.

While Carson's system allows the simultaneous feeding of blisters at the filling location and moving of cassettes in and out thereof, there is still a single filling station. Also, it has the major drawback of being bulky. The overall layout of the system extends within a single plan, which further renders the system difficult of being scaled without rethinking the whole system layout.

SUMMARY

The scalability problem of current medication dispenser systems and the delay caused by their feeding station replenishing process are solved by providing i) each of a plurality of medication filling units with a temporary storage rack for medication containers, this rack being accessible from a side of the filling units that faces a medication storage unit, and ii) a medication container handling system between the storage racks and a storage unit that moves medication containers between a storage unit and the temporary storage racks simultaneously to the operation of the filling units.

According to an illustrative embodiment, there is provided a system for automatic filling of medication organizers, the system comprising:

a storage unit for medication containers that is accessible from a first side thereof;

a plurality of medication organizer filling units, each having a temporary storage rack that is accessible from a side of the medication filling units that faces the storage unit; and a container handling system that is positioned between the storage unit and the temporary storage racks and that is movable between the storage unit and each of the temporary storage racks for transferring selected medication containers therebetween.

According to a more specific illustrative embodiment, there is provided a system for automatic filling of medication organizers, the system comprising:

a storage unit for medication containers that is accessible from a first side thereof;

a plurality of medication organizer filling units, each having i) a temporary storage rack that is accessible from a side of the medication filling units that faces the storage unit, ii) a support table for receiving and indexing a plurality of the medication organizers, and iii) a medication dispensing tool for picking medications in one of the medication containers on the temporary storage rack and for moving the medications into at least one of the plurality of medication organizers;

a container handling system having a container gripper that is positioned between the storage unit and the temporary storage racks and that is movable between the storage unit and each of the temporary storage racks for transferring selected medication containers therebetween; the container gripper being mounted to a carriage that is movable along two perpendicular axes; and a container replenishing rack that is accessible from outside the system and within reach of the container handling system for receiving at least one of the medication containers that is to be moved between the outside of the system and the storage unit.

According to another illustrative embodiment, there is provided a container handling system for moving a medication container between a storage unit and temporary storage racks, the system comprising:
  a frame assembly;
  a carriage that is mounted to the frame assembly between the storage unit and temporary storage racks so as to be slidable along first and second perpendicular axes;
  a container gripper mounted to the carriage and having an open side for receiving the medication container and for moving the medication container between the storage unit and the temporary storage racks.

According to still another embodiment, there is provided a method for automatic filling of medication organizers, the method comprising:
  a plurality of medication organizer filling units, each having a temporary storage rack, filling at least one medication organizer with medications taken in at least one medication container located in the temporary storage rack; and
  simultaneously moving another medication container between a storage unit and a selected one of the temporary storage racks.

The expression "rack" is to be construed in the description and in the claims as including any support or more generally spaces or areas that allows receiving and supporting objects such as medication containers.

The expression "gripper" is to be construed in the description and in the claims as including any system or mechanism allowing a selective contact with an object for solidary movement therewith.

Other objects, advantages and features of embodiments of a system and method for automatic filling of medication organizers will become more apparent upon reading the following non-restrictive description of preferred embodiments thereof, given by way of example only with reference to the accompanying drawings.

BRIEF DESCRIPTION OF THE DRAWINGS

In the appended drawings:

FIGS. 7 and 8 are respectively a cut out perspective view and a cut out side elevation view of the system from FIG. 1, showing the container handling system;

FIGS. 9 and 10 are respectively first and second side perspective views of the container handling system; FIG. 10 illustrating the handling system with a medication container therein;

FIG. 12 is a block diagram of the system from FIG. 1.

DETAILED DESCRIPTION

Figure 1:
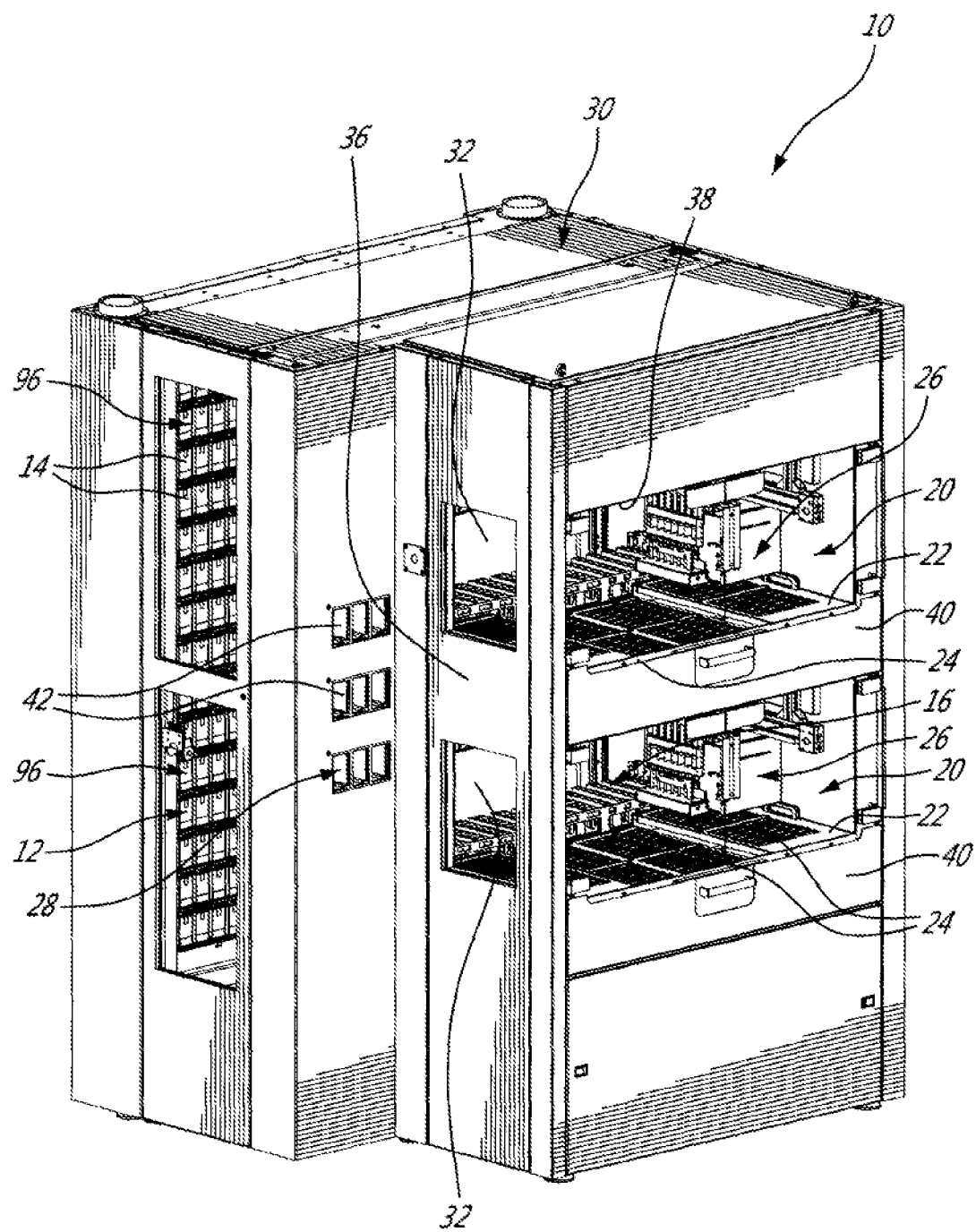
FIGS. 1 and 2 are respectively left and right side perspective views of a system for automatic filling of medication organizers according to an illustrated embodiment.

In the following description, similar features in the drawings have been given similar reference numerals, and in order not to weigh down the figures, some elements are not referred to in some figures if they were already identified in a precedent figure.

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, un-recited elements.

An illustrated embodiment of a system 10 for automatic filling of medication organizers 24 will now be described with reference first to FIGS. 1 and 2.

The system 10 comprises:
  a container storage unit 12 for receiving a plurality of medication containers 14-14';
  two medication organizer filling units 20, each including i) a temporary storage rack 16, ii) a support table 22 for receiving and indexing a plurality of medication organizers 24; and iii) a medication dispensing tool 26 for picking medications (not shown) from one of the medication containers 14-14' on the temporary storage rack 16 and for moving the medications into the medication organizers 24 (also referred to herein a 'dose packs') on the support table 22;
  a container handling system 25 (see on FIG. 7) for moving selected medication containers 14-14' between the container storage unit 12 and the medication organizer filing units 20; and
  a container replenishing rack 28.

In summary, containers 14-14', including different solid oral medications, are stored in the container storage unit 12 and a plurality of empty medication organizers 24 are arranged in predetermined positions on the support tables 22 of the filling units 20. The container handling system 25 retrieves one by one in the storage unit 12 the containers 14-14' corresponding to medications that need to be filled in the organizers 24 according to patient prescription profiles inputted in the system 10. The container handling system 25 moves each container 14-14' to a selected one of the two medication organizer filling units 20, which fills the medication organizers 24 according to the patient prescription profiles.

Each of the filling units 20 operates independently to the other and the container handling system 25 moves medication containers 14-14' between the storage unit 12 and the filling units 20 independently and simultaneously to the filling of the medication organizers 24 by both filing units 20.

The above-listed components 12, and 16-28 are contained in an enclosure 30 that includes windows 32-34, doors 36-38, drawers 40 and openings 42 that allows visualizing the operation of the system 10 and accessing some of the components 12-38 of the system 10 for maintenance or replenishing thereof as will be described hereinbelow in more detail.

The openings 42 are registered with the rack 28 and allows inserting new containers 14-14' in the system 10 and receiving empty containers 14-14' therefrom. The container handling system 25 allows moving these containers 14-14' between the storage unit 12 and the container replenishing rack 28. The container-replenishing rack 28 is configured similarly to the storage unit 12.

As will become more apparent upon reading the following description, the dimensions, forms, mechanisms, number and positions of the windows 32-34, doors 36-38, drawers 40 and openings 42 may be different than illustrated in the Figures.

Each of the components 12, 16-28 of the system 10 will now be described in more detail.

Figure 3:
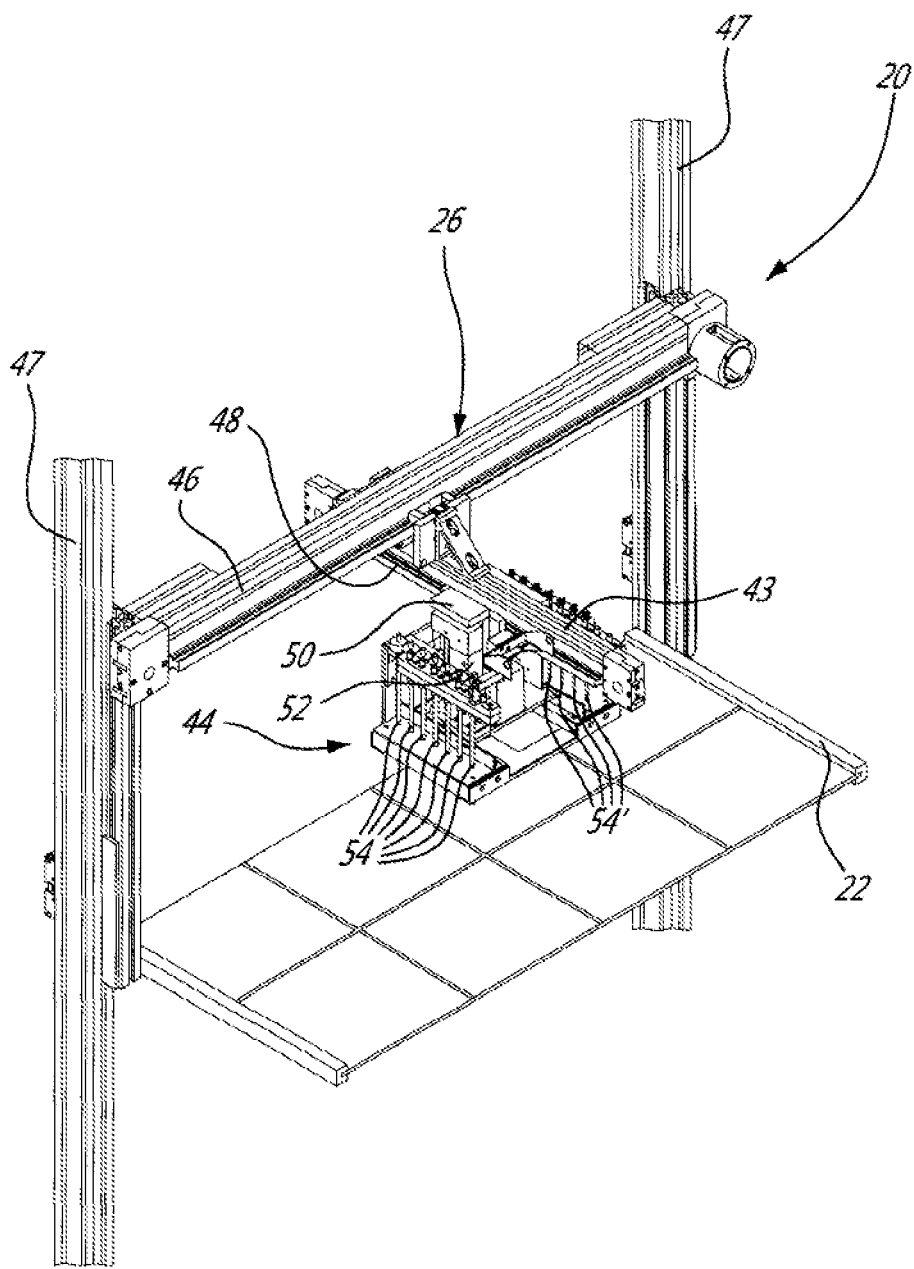
FIGS. 3 and 4 are respectively a perspective schematic view and a top plan view of one of the medication organizer filling units from the system of FIGS. 1 and 2.
Figure 4:
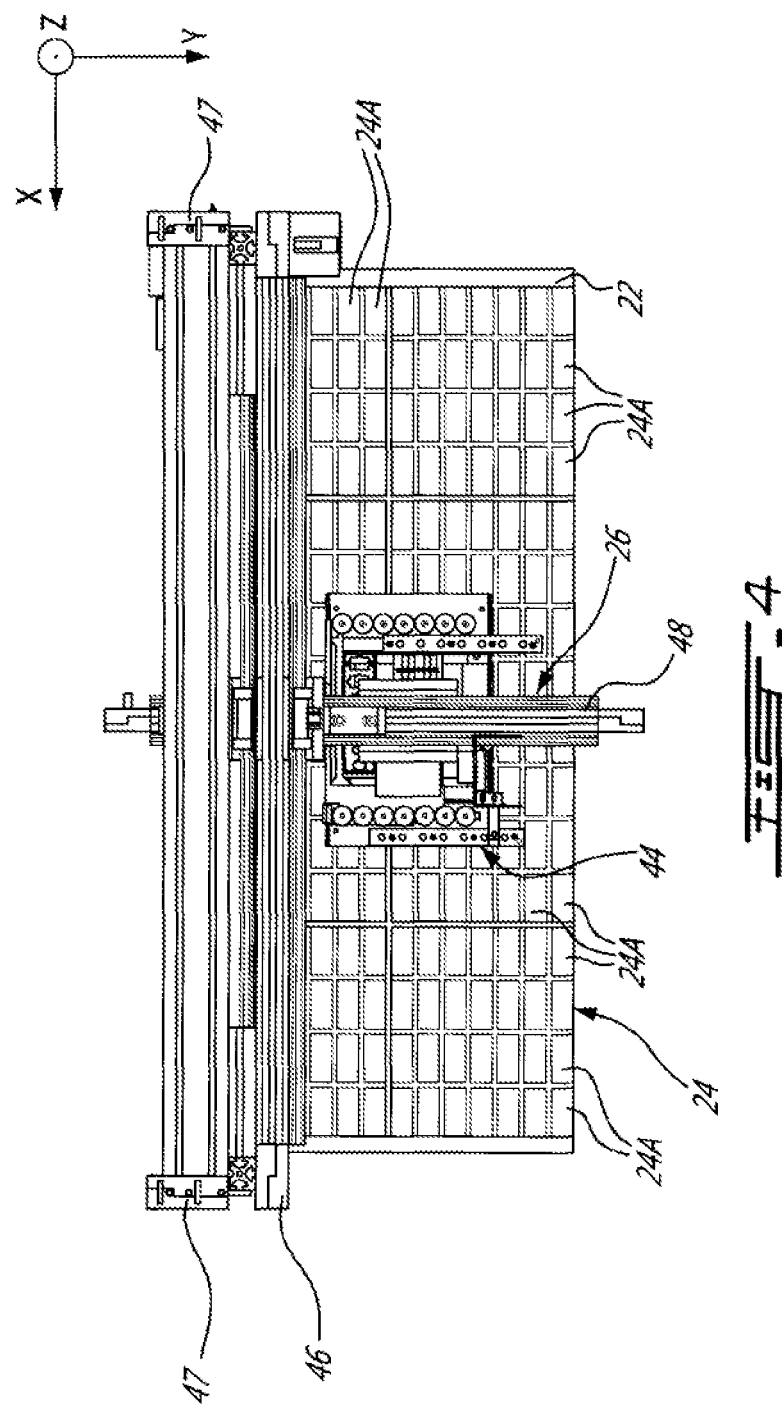
Figure 5:
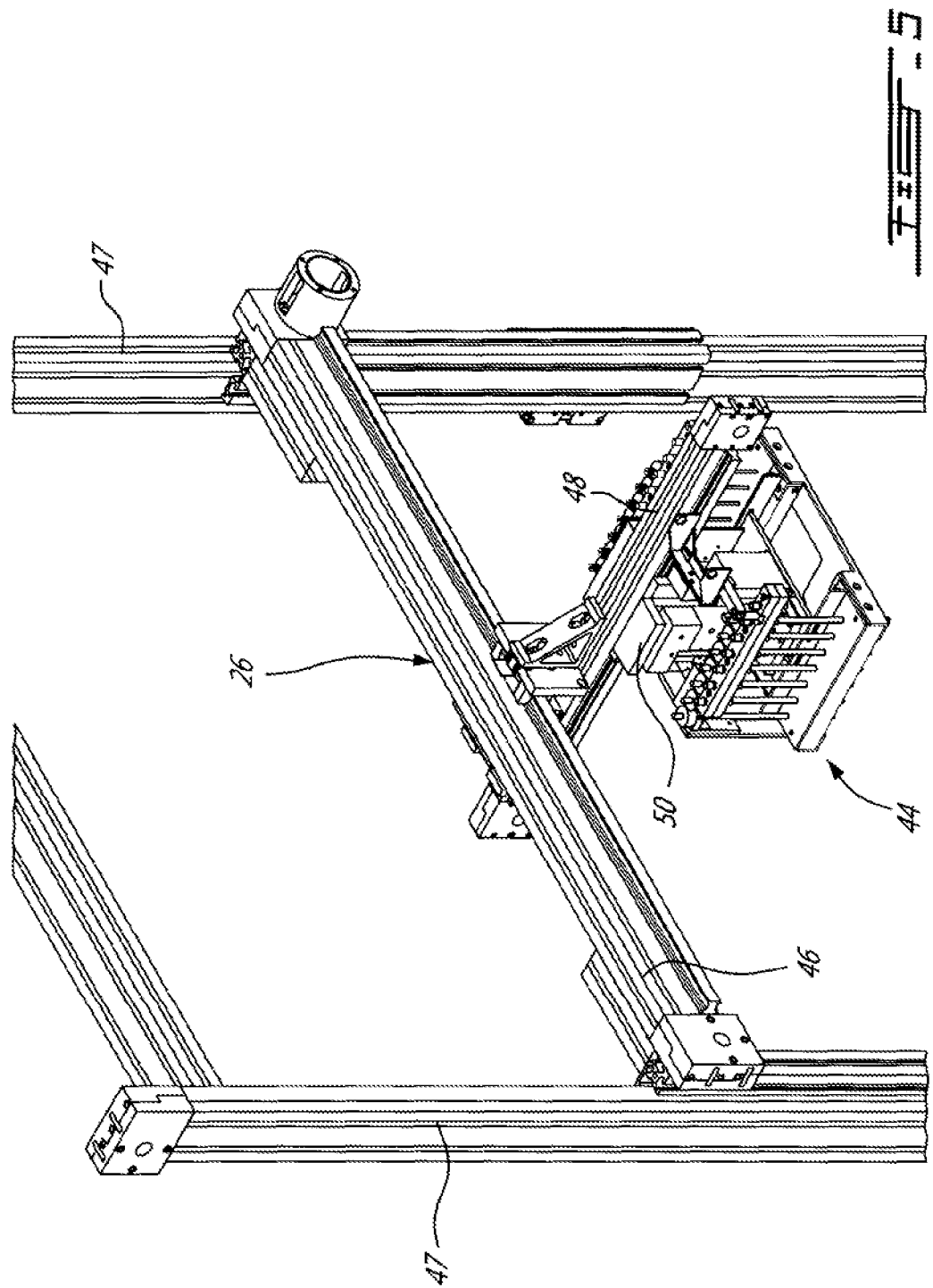
FIG. 5 is an enlarged view of part of the medication organizer filing units from FIGS. 3 and 4.

With references first to FIGS. 3 to 5, one of the two identical medication organizer filling units 20 will be described.

The dispensing tool 26 of the filling units 20 includes a tool head 44 that is displaceable along three translational degrees-of-freedom (hereinafter DOF), as illustrated by directions X, Y and Z in FIG. 4. Moreover, it is contemplated to provide a translational or rotational DOF to the tool head 44, as will be described hereinafter.

More specifically, the filling unit 20 has a first support beam 46 slidably mounted on a pair of vertical posts 47. The vertical posts 47 are typically a pair of linear actuators, with the moving portion of the linear actuators connected to opposed ends of the first support beam 46 such that the first support beam 46 is displaceable along the Z direction.

A second support beam 48 is operatively connected to the first support beam 46, such that the second support beam 48 is displaceable along direction X with respect to the first support beam 46. For instance, the first support beam 46 is a linear actuator, with a moving portion of the linear actuator connected to the second support beam 48.

A carriage 50 is mounted to the second support beam 48, and is displaceable along direction Y with respect to the second support beam 48. The tool head 44 is fixedly mounted to the carriage 50 so as to be supported therefrom. An actuator 52 is provided for the independent actuation of the tool head 44 with respect to a remainder of the filling unit 20. Accordingly, there are two degrees of actuation for the tool 26 in the vertical direction.

According to the illustrated embodiment, the actuator 52 is a linear actuator providing an additional translational degree of actuation along the Z axis. This linear actuator is preferably used for the capsule-grasping movements of the tool head 44. In such a case, the actuator 52 is advantageously smaller and more power-efficient than the linear actuators of the vertical posts 47, considering the numerous displacements to be performed by the tool head 44.

According to another embodiment (not shown), the actuator 52 is a rotational actuator, such that a rotational DOF is provided for the tool head 44. The actuator 52 may also combine both a translational and a rotational degree of freedom.

The expressions 'beam' and 'post' should not be construed herein in a limitative way and both expressions are intended to include any elongated structural members.

The tool head 44 has two rows of seven fingers 54-54'. Each of the fingers 54-54' is provided to carry an oral-solid medication item or tablet (hereinafter "medication item" for simplicity purposes) from containers 14-14' to dose packs 24, as will be described hereinafter. According to the illustrated embodiment, each of the fingers 54-54' have a suction tip by which medication items are releasably connected to the fingers 54-54'.

One of the two series of seven fingers 54' is of different sizes (e.g., smaller) to be capable of grasping smaller medication items. A trap (not visible) is actuated to determine which set of the fingers 54 or 54' is moved downwardly to grasp medication items.

According to another embodiment (not shown), more or less than two series of fingers 54-54' are provided. Also, the number of fingers 54-54' per series can be different than seven (7).

According to the illustrated embodiment, the containers can have two sizes: a first one configured and sized with seven (7) holes to receive a single row of seven fingers 54 of a filling tool head 44 (containers 14') or with 14 holes to simultaneously receive two rows of fingers 54-54' of the filling tool head 44 (containers 14). The container 14 has a containing volume which is about double the volume of the container 14'.

It is to be noted that, while the system 10 is configured to receive two different sizes of medication containers 14-14', it can be modified to accommodate a different number of differently sized containers 14-14' and/or containers of different volumes.

Figure 2:
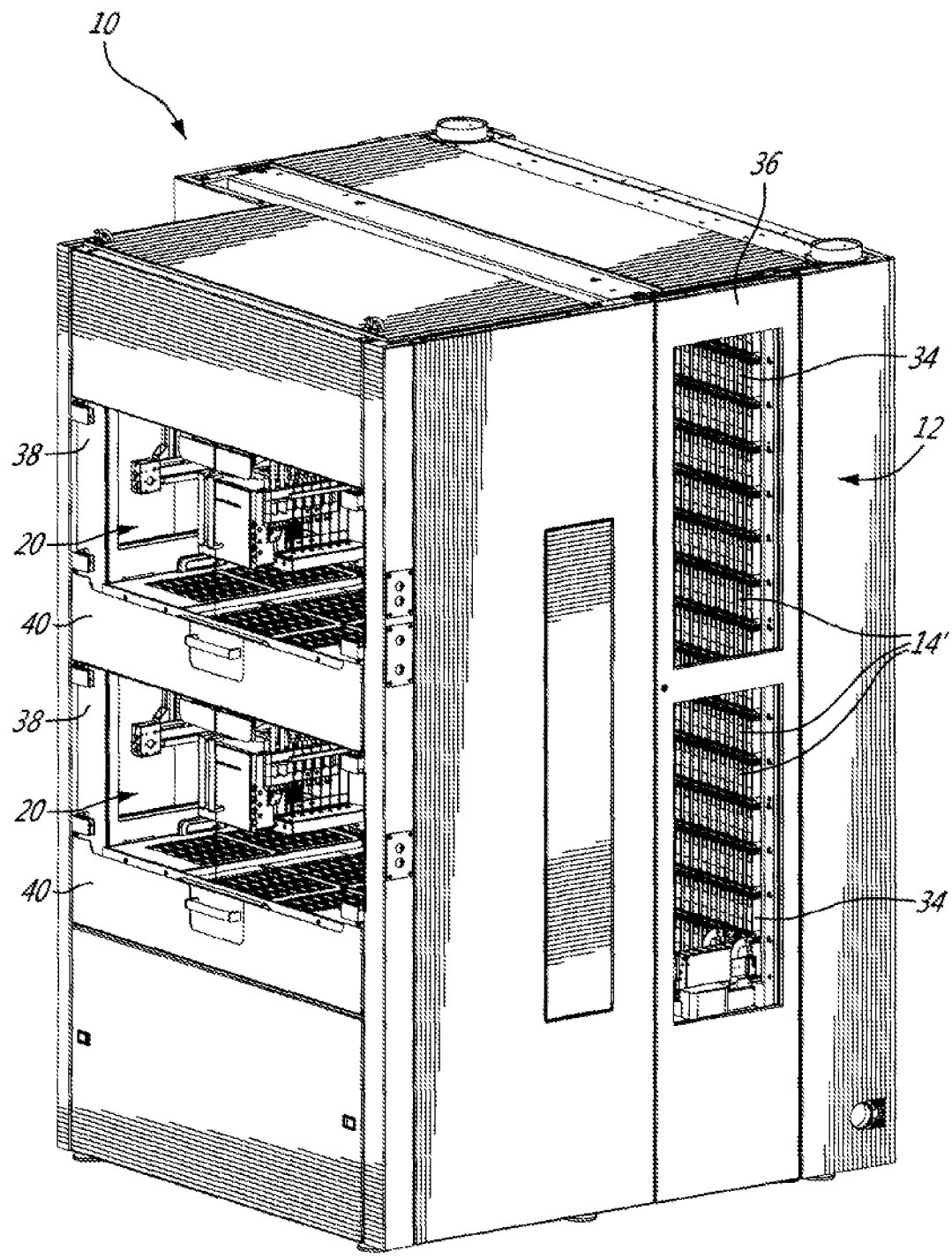
Figure 11:
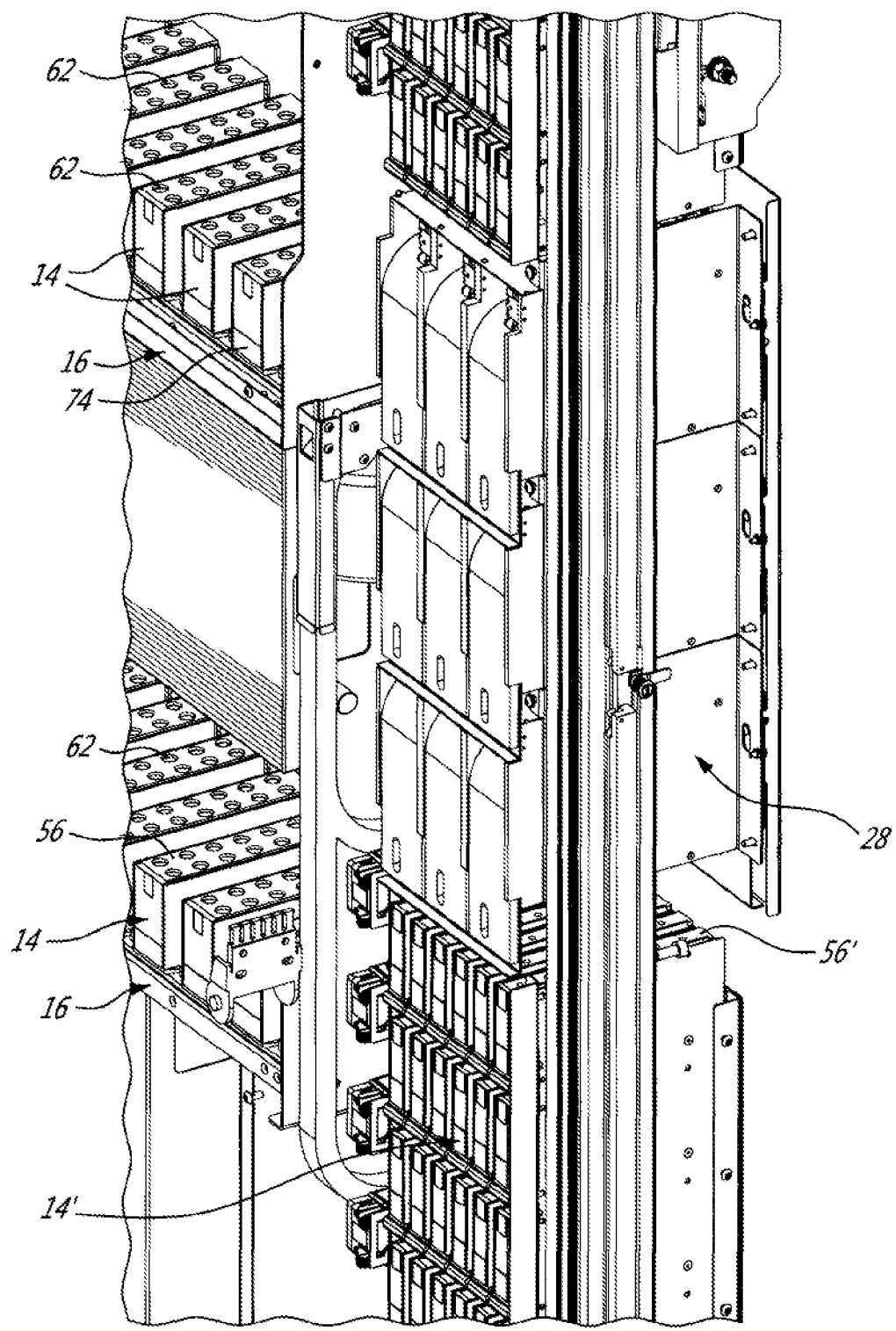
FIG. 11 is a cut out perspective view showing the replenishing rack of the system from FIG. 1.

Referring to FIGS. 1 and 11, the medication organizer filling unit 20 is shown having a temporary storage rack 16, and a plurality (i.e., eight) of dose packs 24 on the support table 22. It is seen that the dose packs 24 have a 28-receptacle format, and that each pack 24 has 28 receptacles 24A for receiving four (4) doses per day for a seven-day period. It is pointed out that, although the dose packs 24 are illustrated in a 28-receptacle format, other formats of the dose pack 24 may also be used, for instance, with more or fewer than 28 receptacles.

Therefore, the tool head 44 of the filling unit 20 is movable along the axes X, Y and Z in order to transport medication items from containers 14-14' on the temporary storage rack 16 to the dose packs 31.

It is to be noted that the temporary storage racks 16 can take any form that can receive and support medication containers 14-14'. Each temporary storage rack 16 is positioned in the medication organizer filling unit 12 so as to be within the reach of the tool 44 and accessible from a side of the medication filling unit that faces the storage unit, so as to be accessible by the container handling system 25.

Turning now briefly to FIG. 11, the containers 14 and 14' are provided with covers 56 and 56' that are perforated with holes 62 that are sized as a function of the size of the medication items. Such covers 56-56' ensure that only one capsule per finger 54A or 548 exits the container 14 or 14'. Accordingly, the tool head 44 is displaced to a position above a selected one of the containers 14-14' on the temporary storage rack 16, whereby the fingers 26 are in position to each collect a medication item. This is as a function of the doses required in the dose packs 24, as will be discussed hereinafter.

Therefore, by the use of seven fingers 54A or 548, the receptacles of one of the dose packs 24 may all be filled simultaneously for a first time period for all seven days with one capsule of medication.

In operation of the filling unit 20, the head 44 travels above position on the temporary storage rack, 16 that is registered with a selected container 14 or 14' so as to collect medication items to be dropped into the appropriate dose packs 24. Once the dose packs 24 are filled with available medications from the container-storage unit 12, the dose packs 24 may be pulled away from the filling unit 20. For that purpose, the table 22 is made retractable out of the enclosure 30. This configuration enables a second series of dose packs 24 to be filled while a first series of dose packs 24, pulled away from the filling unit 20, is hand-filled by the operator with medication not stored in the container-storage unit 12.

According to another embodiment (not shown) another mechanism than a retractable table is used to support and move the dose packs 24 in and out of the enclosure 30.

Figure 6A:
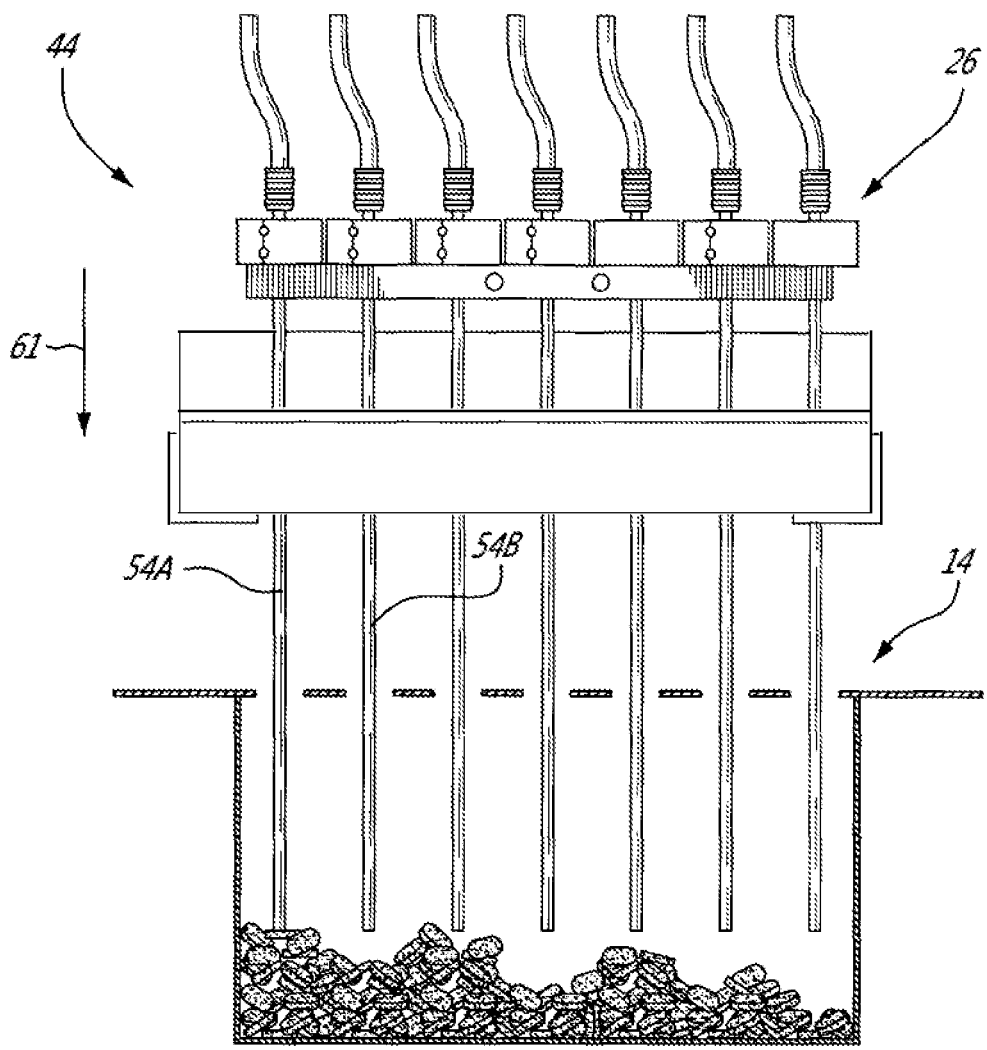
FIGS. 6A-6B are schematic views of a pair of fingers of the tool head for insertion in a medication container, showing respectively, a) an oral-solid medication item being grasped by one of the fingers; and b) a plurality of oral-solid medication items being grasped by the fingers.
Figure 6B:
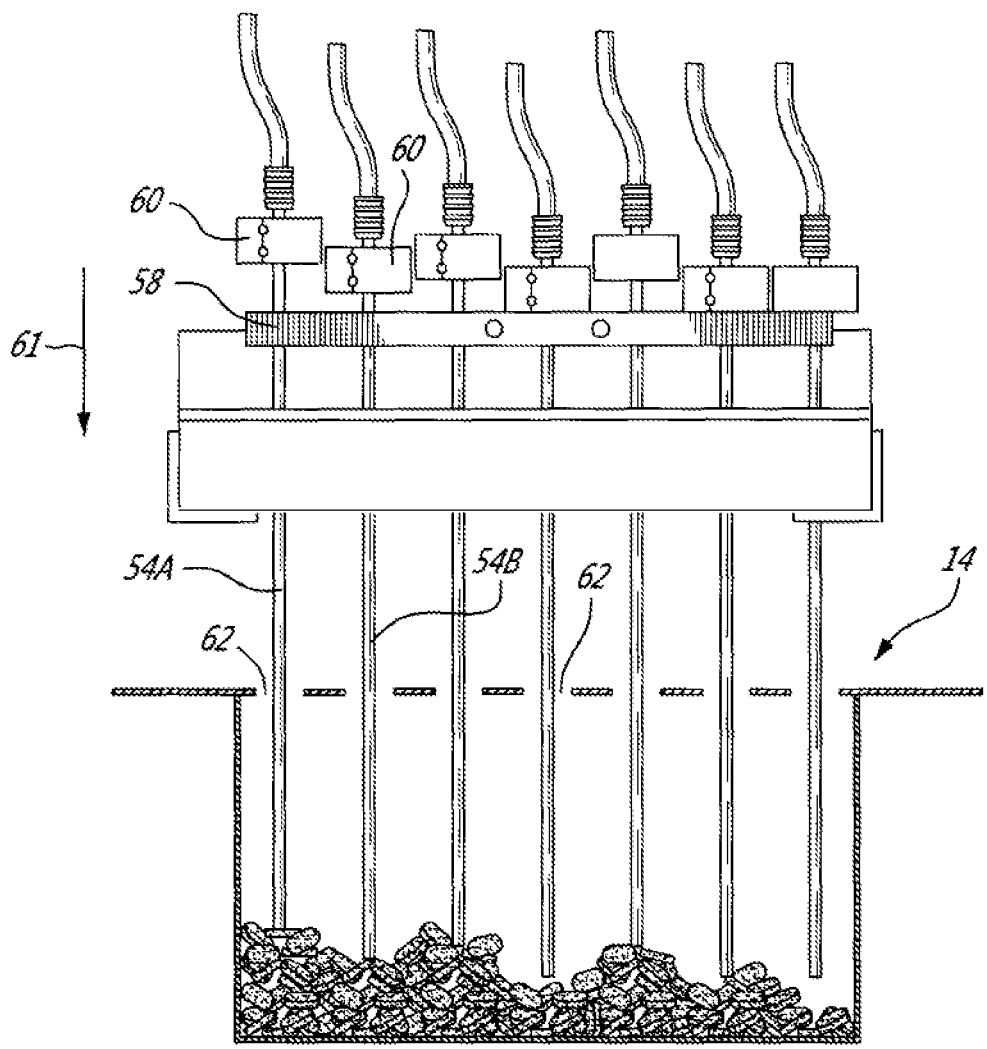

The tool head 44 will now be described in more detail with references to FIGS. 6A and 6B. The fingers 54 are slidably mounted to a support rack 58 so as to be displaceable in translation along the Z axis. A ring 60 is provided at the proximate end of each finger 54 to bias the fingers 54 downwardly under the force of gravity. In operation, the support rack 58 is moved downwardly (see arrow 61) while the fingers 54 are being inserted within the container 14 through holes 62 in the container's cover 56.

The fingers 26 are freely mounted onto the support rack 58 so as to be displaceable vertically, while being pulled downwardly by the effect of gravity. With reference to FIG. 6B, this allows fingers 54 that have reached the level of content to slide upwardly relative to the support rack 58 while the tips of other fingers 54 continue to move towards the bottom until they reach the level of content therein. Accordingly, the risk of having a medication item dislodged from one of the fingers 54 is reduced by this suspension mechanism.

The fingers 54 are each connected to a vacuum system (not shown), such that a tip of each of the fingers 54 is subjected to a pressure differential from ambient pressure, that will be of sufficient magnitude to grasp a medication item.

The suction at the tip of each of the fingers 54 is controlled individually, such that any combination of the fingers 54 can be actuated over the seven-day period represented by a row of the dose packs 24. This is typically performed by on/off valves between the vacuum source and the tips of the fingers 54.

According to a more specific embodiment, each of the fingers 54 are provided with pressure sensors, so as to determine whether a medication item has been grasped by the respective fingers 54, and whether the medication item has been released at the appropriate position of the output arm. Other types of sensors, such as optical sensors (using for example LED's) and cameras can also be used.

It is to be noted that an embodiment of the filling unit 20 is not limited to the illustrated tool head or to any mechanism to move such a tool head. For example, the tool head can be mounted to an articulated arm.

Also the configuration of the temporary storage rack 16 may be different than illustrated.

With references to FIGS. 7 to 10, the container handling system 25 will now be described in more detail.

The container handling system 25 includes a container gripper 64 that is positioned between the temporary storage racks 16 of the medication organizer filling units 20 and the container-storage unit 12 and is movable along the X and Z axis therebetween.

The container handling system 25 includes a first support beam 66 that receives the container gripper 64 via a carriage 70 for slidable movement of the container gripper 64 therealong (along the X axis).

Similarly, the beam 66 is slidably mounted to a pair of vertical posts 68 (only one shown) therebetween. The vertical posts 68 are typically a pair of linear actuators, with the moving portion of the linear actuators connected to opposed ends of the first support beam 66 such that the first support beam 66 is displaceable along the Z direction.

The container gripper 64 is pivotally mounted to the carriage 70 via a rotational actuator 72 which allows the container gripper 64 to pivot 180 degrees about an axis that is parallel the vertical posts 68. The container gripper 64 is thus movable between a first position where it faces the container-storage unit 12 and a second position where it faces the temporary storage rack 16.

The container gripper 64 further includes a receiving plate 76 that is distanced from the carriage 70 and that includes side and bottom guide elements 78 and 80 together defining a track 81 that is configured and sized to receive and guide the containers 14 or 14'.

Indeed, each of the unit 12, support 16 and replenishing rack includes a series of slots 74 and 74', each including a channel that allows slidably receiving the containers 14 and 14' respectively. Each of the containers 14 and 14' includes a protruding element (not shown) that cooperates with the channel to align the containers 14-14' within the slots 74-74' and guide them in and out of the slots 74-74'.

A movable head 82 that is equipped with an electromagnet 84 is mounted to the receiving plate 76 so as to be movable along the track 81. Each of the containers 14 and 14' includes a metal casing 86 which gives the movable head 82 a grip thereon when the electromagnet 84 is energized.

A gap 77 between the actuator 72 mounting plate 79 and the container gripper receiving plate 76 yields an interspace to house the wirings 88 of the movable head 82.

The container gripper 64 also includes a code reader or scanner 90 for reading identification codes on the containers 14-14' and a proximity sensor 92 for detecting the presence and position of a container 14 or 14' within the container gripper 64.

The code reader 90 is mounted at the front of the gripper 64 via two bracket members 94 that are secured to the plate 79. The code reader N can be for example in the form of a bar code scanner, an RFID code reader, etc. The reader 90 is adapted to read a code or an identification affixed onto each container 14-14'. The reading of such a code or identifier on the container 14-14' allows a verification that the container picked by the container handling system 25 corresponds to the medication selected by the system 10.

The initial positioning of the container gripper 64 within the X-Y plane is based on the expected position of a selected container 14-14' container. Indeed, a database allows the system 10 to store and retrieve the position of all containers 14-14' in the storage unit 12 and temporary storage racks 16. The positioning and management of the container 14-14' within the system for automatic filling of medication organizers 10 can then be dynamic. According to another embodiment, the code reader 90 is omitted and the identification of the containers 14-14' is based on the indexation of their position.

The proximity sensor 92 allows detecting the presence and positioning of a container 14-14' within the container gripper 64. While the proximity sensor 92 is based on field emission, it can take other form, such as, without limitations, a mechanical switch.

Since proximity sensors and code readers are believed to be well-known in the art, they will not be described herein in more detail for concision purposes.

In operation of the container handling system 25, the container gripper 64 is first oriented by the actuator 72 to face the storage unit 12. The container gripper 64 is then moved horizontally and/or vertically to be positioned in front of the location of a container 14-14' to be picked or dropped. The code reader 90 is then used to confirm the absence of a container in the case that a container is to be dropped at that location or to confirm the identification of a container to pick. The head 82 either i) pushes the container 14 or 14' towards the opening slot to store back the container 14 or 14' before de-energizing the electromagnetic head 84 or ii) moves towards the container 14 or 14', energizes the electromagnetic head 84 to grip the container 14 or 14' and pulls back to correctly position the container for its displacement. The operation is similar in cases of picking or dropping a container 14 or 14' on either one of the two (Z temporary storage racks 16 of the filling units 20 or in the container replenishing rack 28.

According to another embodiment (not shown), the first support member 66 is vertical and is slidably mounted to two horizontal parallel beam members (not shown). According to this embodiment, the orientation of the gripper 64 is tilted 90 degrees relative to the carriage 70 compared to the first illustrative embodiment.

The container handling system 25 is further not limited to the illustrated embodiment and other mechanism or system can be used to move selected medication containers 14-14' between the container storage unit 12 and the medication organizer filing units 20.

For example, a container handling system according to another embodiment includes a gripper that is provided with a slide that allows gripping a container 14 or 14' and moving it on the slide between the side of the handling system facing the storage unit 12 and the side facing the temporary storage racks 16. Such a system is free of a rotation actuator 72.

With reference to FIG. 12, the system for automatic filling of medication organizers 10 further includes or is connected to a controller 100 that is coupled to the two medication organizer filling units 20 and to the container handling system 25.

The controller 100 is typically a processing unit that is programmed to operate the preparation of a plurality of dose pack jobs as a function of an inventory of medication items present in the storage units 12, as a function of patient prescription files entered in the system 10.

The controller 100 is therefore connected to an interface 102, by which a user person (e.g., pharmacist, chemist, technician), enters various jobs. The jobs to be performed are patient prescription files in the form of oral-solid medication items to be converted into dose packs associated with the patient (i.e., customer). The jobs are typically entered as digital files or may be entered manually through the interface 102. The interface 102 has a display screen, as well as associated peripherals, such as a keyboard, mouse, disk drives, printer, internet/ethernet ports.

A dose pack calculator 104 is also provided in association with the controller 100. The dose pack calculator 104 creates a dose pack profile from the patient prescription file. The dose pack profiles comprise: (1) an identification of the location of the containers 14-14' in the temporary storage rack 16 from which medication items must be grasped, and (2) the receptacles 24A of each dose pack 24 in which the medication items will be received. Accordingly, the corresponding filling unit 20 receives a series of maneuver instructions to fill the dose packs. The dose pack calculator 104 is associated with the controller 100 which actuates the dispensing mechanism as a function of the dose pack profiles.

In parallel to the filing of the dose packs 24 by the filling units 20, the container handling system 25 moves medication containers 14-14' between the two (2) temporary racks 16 of the filling units 20 and the storage unit 12 in response to commands received from the controller 100 based on incoming dose pack profiles.

Using the interface 102, a user can also instruct the container handling system 16 to drop or pick containers 14-14' on the replenishing rack 28.

A database 106 is provided in association with the controller 100, such that the various jobs (i.e., patient prescription files having been converted to dose pack profiles) may be stored in the wait of being performed. It is contemplated to store dose pack profiles of specific customers, in such a way that a customer's identification may be the only information required through the interface 102 to order the preparation of a dose pack from the controller 100 for that customer.

A confirmation sensor 108 is connected to the controller 100 and is actuated as a function of commands from the controller 100. The confirmation sensor 108 is provided to determine whether a medication item has been dispensed into a prescribed receptacle 24A. The detection data is sent to the controller 100 by the confirmation sensor 108, whereby the controller 100 will update its accounting of the medication items dispensed in a job.

The confirmation sensor 108 may take various configurations. For instance, it has been described previously that the fingers 54 may be provided with a pressure sensor. The confirmation sensor 108 may be such pressure sensors, with pressure profiles being fed to the controller 100 has detection data. The pressure profiles are then interpreted by the dose pack calculator 106 to determine whether the medication item has been successfully dispensed in the appropriate dose pack 24.

Alternatively, or additionally, the confirmation sensor 108 may be a visual or optical sensor, that is configured to detect the dispensing of a medication item into a prescribed receptacle 24A, so as to confirm that a medication item has been dispensed.

The controller 100 is connected to both filling units 20 so as to actuate the dispensing tool 26 and the suction of the fingers 54-54'. More specifically, the controller 100, by way of its association with the dose pack calculator 104, will convert dose pack profiles into a plurality of actuation commands of the filling units 20. More specifically, as a function of the position and level of the medication into the medication containers 14-14', the controller 100 will actuate the linear and rotational actuators of the dispensing tool 26 as well as the grasping action of the fingers 54, so as to dispense appropriate medication items into the prescribed receptacles 24A of the dose packs 24.

Therefore, in order to perform a job associated with a single patient prescription file, the system 10 will obtain the prescription file from the interface 102 or from the database 106.

The patient prescription file is converted by the controller 100, in association with the dose pack calculator 104, into a dose pack profile comprising a plurality of displacements and actuations of the corresponding filling unit 20, as a function of the position of the medication items in the temporary storage rack 16, and of the position of the dose packs 24 on the support table 22.

The filling unit 20 will then proceed to the displacement of medication from the selected container 14 or 14' to the dose pack 24, with the confirmation sensor 108 confirming that a medication item was appropriately dispensed as prescribed.

The controller 100 will account the detection data from the confirmation sensor 108. The inventory data of the dose pack provided by the controller 100 will result in feedback as to the completion of the job.

The system for the automatic filling of medication organizers 10 advantageously has the capacity of displacing a plurality of medication items at once. More specifically, it has been observed that prescriptions often require a same medication item to be taken over a seven-day period at a same period of a day. Each filling unit 20 therefore has the capacity of grasping seven medication items in one displacement from the temporary storage rack to the dose packs 31.

In order to minimize the number of movements performed by the filling units 20, and therefore accelerate the completion of the jobs, it is considered to proceed by filling all receptacles 24A of all dose packs 24 with a first type of medication item. Accordingly, the distribution of a first type of medication from the corresponding container 14 or 14' on the temporary storage rack 16 is performed for all rows of the dose packs 24. Once the distribution of the first type of medication is completed, the distribution of the medication for a second type of medication item issued from another container 14 or 14'.

Some types of medication may be absent from the storage unit 12. In such cases, it is contemplated to manually fill the dose packs with such medication before or after the preparation of the dose pack 24 with the system 10. A report is typically produced to indicate what medication items are absent from the storage unit 12 to complete the job. The report typically contains a sequence to follow to fill the dose pack 24. In an embodiment, the support table 22 has on its surface an array of sequential numbers sized such that each receptacle 24A on the support table 22 has its own location identified with one of the sequential numbers. The report identifies the receptacles 24A with their sequential number, and indicates what medication item is required in the identified receptacles 24A.

It is suggested to have appropriate personnel review the jobs performed with the dose packs 24, to ensure that the prescriptions have been respected. For instance, the interface 102 preferably has a printer, such that a check list could be printed out for the review of the contents of a dose pack 24 by a pharmacist prior to the dose pack being sealed off.

It is to be noted that many modifications could be made to the system 10 described hereinabove and illustrated in the appended drawings. For example:

the medication container 14 and 14' is not limited to the illustrated embodiment and may take any form which allows a robotic tool to pick one or more solid medication therein;

the tool head 44 can be adapted to pick solid medications in another container than those illustrated and is not limited to any picking mechanism;

the container replenishing rack 28 can take other form than illustrated or be omitted. For example, the back of the storage unit 12 can be closed by a door which would allow accessing the container 14-14' therein during operation of the system 10;

the system 10 is not limited to two (2) medication organizer filling units 20 and can be equipped with any number thereof. The filing units can be positioned side-by-side and/or on top of each other. The number of container storage unit, of container handling system, and/or of container replenishing rack may also be different than illustrated.

Although a system for automatic filling of medication organizers has been described hereinabove by way of illustrated embodiments thereof, it can be modified. It is therefore to be understood that numerous modifications may be made to the illustrative embodiments and that the scope of the claims should not be limited by the preferred embodiment but should be given the broadest interpretation consistent with the description as a whole.

What is claimed is:

1. A system for automatic filling of medication organizers, the system comprising:
    a storage unit for medication containers that is accessible from a first side thereof;
    a plurality of medication organizer filling units, each having i) a temporary storage rack that is accessible from a side of the medication filling units that faces the storage unit, ii) a support table for receiving and indexing a plurality of the medication organizers, and iii) a medication dispensing tool for picking medications in one of the medication containers on the temporary storage rack and for moving the medications into at least one of the plurality of medication organizers;
    a container handling system having a container gripper that is positioned between the storage unit and the temporary storage racks and that is movable between the storage unit and each of the temporary storage racks for transferring selected medication containers therebetween, the container gripper being mounted to a carriage that is movable along two perpendicular axes; and
    a container replenishing rack that is accessible from outside the system and within reach of the container handling system for receiving at least one of the medication containers that is to be moved between the outside of the system and the storage unit.

2. The system as recited in claim 1, wherein the container handling system further comprises a frame assembly, and
    wherein the carriage is mounted to the frame assembly between the storage unit and temporary storage racks so as to be slidable along the perpendicular axes; and
    wherein the container gripper has an open side for receiving the medication containers and for moving the medication containers between the storage unit and the temporary storage racks.

3. The system as recited in claim 2, wherein the container gripper is mounted to the carriage for pivotal movement about a third axis between a first position, wherein the container gripper faces the storage unit, and a second position, wherein the gripper faces the temporary storage racks, the third axis being parallel to the first axis.

4. The system as recited in claim 3, wherein the container handling system further includes a support beam that defines the second axis and that receives the carriage for slidable movement therealong, the support beam being mounted to a pair of parallel posts for slidable movement along the first axis.

5. The system as recited in claim 1, wherein the carriage includes a track that is configured for receiving one of the medication containers therein.

6. The system as recited in claim 5, wherein the container gripper includes a movable head for gripping and moving the medications containers along the track.

7. The system as recited in claim 6, wherein the medication containers include a metal casing and the movable head includes an electromagnet.

8. The system as recited in claim 1, wherein the container gripper further includes a reader for reading identification codes on the medication containers.

9. The system as recited in claim 1, wherein the container gripper further includes a proximity sensor for detecting the presence of the medication container therein.

10. The system as recited in claim 1, wherein the medication dispensing tool is displaceable in at least three degrees-of-freedom.

11. The system as recited in claim 1, wherein the medication dispensing tool includes a plurality of fingers, each having an independently operable suction tip; the fingers being mounted to a support member so as to be displaceable up and down in a free-floating way relative thereto.

12. The system as recited in claim 11, wherein the plurality of fingers includes at least two sets of fingers of different size that are independently operable.

13. The system as recited in claim 11, wherein each of the medication containers includes a cover provided with holes to allow access to the fingers of the medication dispensing tool.

14. The system as recited in claim 13, wherein the holes are sized as a function of a size of medication items in said each of the medication containers.

15. The system as recited in claim 1, wherein the storage unit, plurality of medication organizer filling units, container handling system and container replenishing rack are contained in an enclosure, the enclosure including an opening to access the container replenishing rack.

16. The system of claim 1, further including a controller and an interface, the interface configured to allow a user to instruct the system, via the controller, to drop or pick containers on the replenishing rack.

\* \* \* \* \*

UNITED STATES PATENT AND TRADEMARK OFFICE
CERTIFICATE OF CORRECTION

PATENT NO. : 11,804,096 B2
APPLICATION NO. : 18/177406
DATED : October 31, 2023
INVENTOR(S) : Jean Boutin It is certified that error appears in the above-identified patent and that said Letters Patent is hereby corrected as shown below:

In the Specification

Column 6, Line 58: Please correct "548" to read --54B--

Column 9, Line 12: Please correct "(Z" to read --(2)--

Signed and Sealed this
Sixteenth Day of April, 2024

Katherine Kelly Vidal
*Director of the United States Patent and Trademark Office*